Oct. 15, 1957     J. B. OLSEN     2,809,857
HINGE FOR USE WITH SAFETY HITCH
Filed Dec. 13, 1954
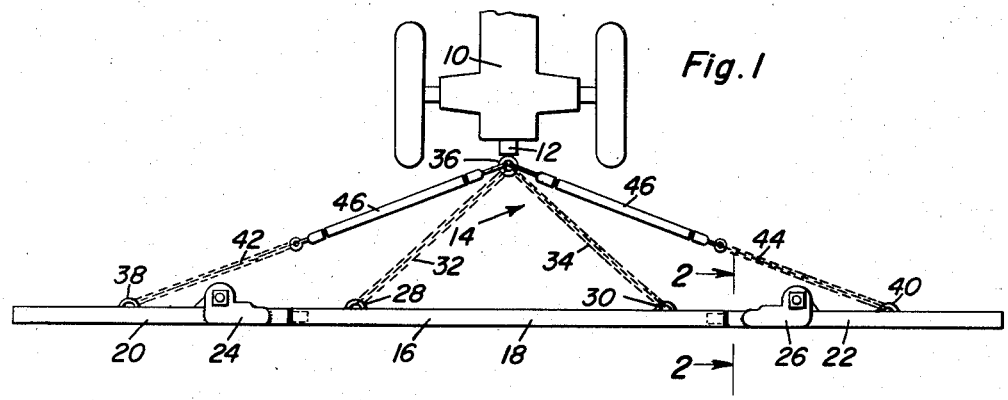
Fig.1
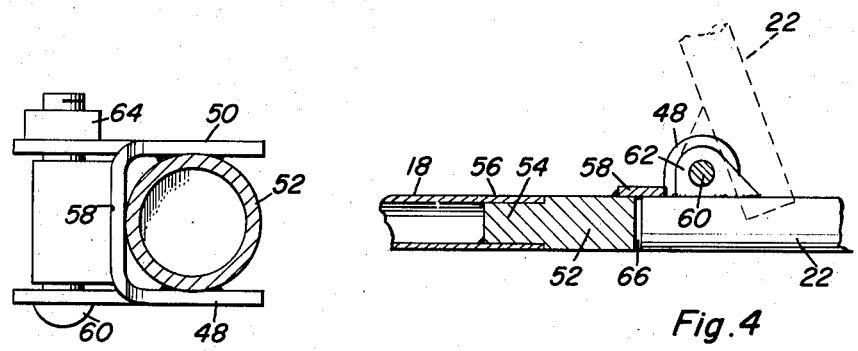
Fig.2
Fig.4
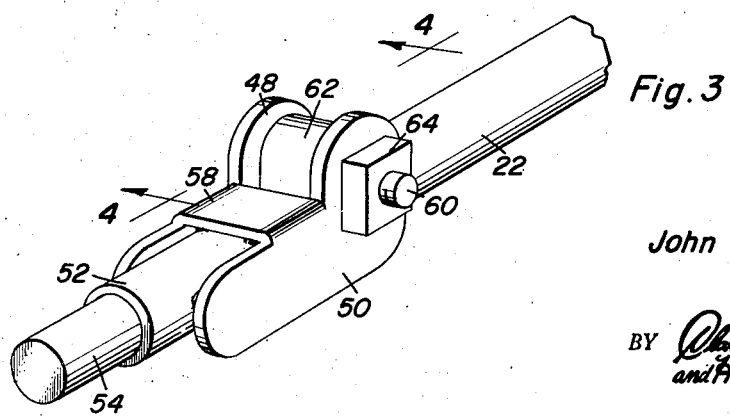
Fig.3
John B. Olsen
INVENTOR.
BY *Clarence A. O'Brien*
*and Harvey B. Jacobson*
Attorneys

United States Patent Office 2,809,857
Patented Oct. 15, 1957

---

2,809,857

HINGE FOR USE WITH SAFETY HITCH

John B. Olsen, Atlantic, Iowa

Application December 13, 1954, Serial No. 474,707

2 Claims. (Cl. 287—100)

This invention relates to a class of agricultural machinery, and more particularly to a hinge for use with the anti-chafing hitch as disclosed and described in the copending application of John B. Olsen, Serial No. 450,075, filed July 22, 1954, for Safety Hitch.

The primary object of the present invention resides in the provision of a hinge for a sectional draft bar which will permit the relative movement of the sections of the draft bar in one direction while limiting the movement of the sections of the draft bar in the opposite direction.

A further object of the invention lies in the provision of a hinge for use with an anti-chafing hitch which will allow relative movement of the sections of a sectional draft bar so as to reduce strain on the various elements of agricultural machinery such as a harrow while making a turn and through the use of which the end sections of a draft bar may be pivoted or folded so that the tractor with the draft bar attached may pass through narrow gates, and the like.

The construction of this invention features a hinge comprising a pair of L-shaped ears interconnected by a central cross portion which forms a stop for the end sections of a draft bar thereby permitting rotation of the end sections of the draft bar in one direction while limiting the rotation thereof in the opposite direction.

Still further objects and features of this invention reside in the provision of a hinge for use with a safety hitch that is strong and durable, which employs a bolt or similar fastener which is removably engaged in the various elements of the hinge to thereby permit disassembly of the sectional draft bar, and which is relatively inexpensive to manufacture thereby permitting wide distribution and utilization.

These, together with the various ancillary objects and features of the invention which will become apparent as the following description proceeds, are attained by this hitch, a preferred embodiment of which has been illustrated in the accompanying drawings, by way of example only, wherein:

Figure 1 is a plan view of the safety hitch employing the hinges comprising the present invention;

Figure 2 is an enlarged sectional view as taken along the plane of line 2—2 in Figure 1;

Figure 3 is a perspective view of the hinge; and

Figure 4 is a sectional view as taken along the plane of line 4—4 in Figure 3 and illustrating in phantom lines the manner in which an end section of the draft bar may be folded.

With continuing reference to the accompanying drawings wherein like reference numerals designate similar parts throughout the various views, reference numeral 10 generally designates a tractor having a draw bar 12 which is designed to pull various types of agricultural equipment. This invention is concerned with a novel type of hinge for use in conjunction with the safety hitch generally designated at 14 between the draw bar 12 and a draft bar 16.

The draft bar 16 is of a sectional construction and includes a center section 18 and end sections 20 and 22. Hinges as are indicated by 24 and 26 constructed in accordance with the concepts of the present invention are provided for hingedly securing the sections 20 and 22 to the center section 18.

Attached to the center section 18 of the draft bar are eyes 28 and 30 to which chains 32 and 34 are attached, the chains 32 and 34 being engaged with a link 36 carried by the draw bar 12.

The end sections 20 and 22 have eyes 38 and 40 attached thereto and chains 42 and 44 interconnect the link 36 with the eyes 38 and 40.

Rotatably mounted and adjustably positioned on the chains 42 and 44 are elongated cylindrical rollers 46 which form smooth anti-chafing surfaces which can be engaged by the wheels of the tractor 10.

Each of the hinges 24 and 26 is generally of a similar construction and it is noted that the hinge 26 includes a pair of substantially L-shaped plates 48 and 50 which are welded or otherwise secured to a cylindrical insert 52. The insert 52 has a portion 54 of reduced cross sectional dimensions which is receivable within the end 56 of the center section 18 of the draft bar 16.

Integrally formed with the plates 48 and 50 is a central connecting portion 58 which may also be welded or otherwise secured to the insert 52. The plates 48 and 50 are provided with suitable aligned apertures therethrough which are adapted to receive a bolt 60 which also extends through a sleeve 62 welded or otherwise secured adjacent to but spaced inwardly from the end of the section 22 of the draft bar 16. The bolt 60 thus forms the pintle for the hinge and it is detachably held in place by means of a nut 64.

In use, when making turns, it can be readily recognized that the sections 20 and 22 may readily pivot forwardly thus reducing the strain on the harrow or other agricultural machinery being drawn by the tractor. However, it is impossible for the sections 20 and 22 to pivot rearwardly due to the fact that the central connecting portion 58 forms a stop since this central connecting portion 58 overlies the space as at 66 between the end of the draft bar section 22 and the insert 52.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hinge for a sectional draft bar having at least a pair of adjacent tubular sections comprising a cylindrical sleeve secured to a first of said tubular sections adjacent an end thereof, a pair of L-shaped ears attached to the other of said tubular sections and extending beyond the end of said other of said tubular sections, said ears having aligned apertures therethrough, and a fastener forming a hinge pintle extending through said apertures and said sleeve, said ears being integrally connected by a central connecting portion, a cylindrical insert secured to said ears between said ears, said other of said tubular sections receiving said insert in the end thereof.

2. A hinge for a sectional draft bar having at least a pair of adjacent tubular sections comprising a cylindrical sleeve secured to a first of said tubular sections adjacent an end thereof, a pair of L-shaped ears attached to the other of said tubular sections and extending beyond the end of said other of said tubular sections, said ears having aligned apertures therethrough, and a fastener forming a hinge pintle extending through said apertures and said sleeve, said ears being integrally connected by a central connecting portion, a cylindrical insert secured to said ears between said ears, said other of said tubular sections receiving said insert in the end thereof, said central connecting portion overlying the space between said insert and the said end of said first of said tubular sections to form a rotation limiting stop.

References Cited in the file of this patent

UNITED STATES PATENTS

| | | |
|---|---|---|
| 445,631 | Smith | Feb. 3, 1891 |
| 938,007 | Manning | Oct. 26, 1909 |
| 1,132,348 | Hunter | Mar. 16, 1915 |
| 1,483,920 | Wamser | Feb. 19, 1924 |
| 2,066,182 | Lenz | Dec. 29, 1936 |